United States Patent Office 3,510,298
Patented May 5, 1970

3,510,298
PROCESS OF ACTIVATING PHOTOCONDUCTIVE MATERIAL IN GLASS BINDER
Richard L. Lane, Penfield, N.Y., assignor to Xerox Corporation, Rochester, N.Y., a corporation of New York
No Drawing. Filed May 13, 1966, Ser. No. 549,807
Int. Cl. G03g 5/00
U.S. Cl. 96—1.5
11 Claims

ABSTRACT OF THE DISCLOSURE

A method of preparing a xerographic glass binder layer which comprises adding an activator material to a mixture of a glass frit and a photoconductive material, followed by coating said mixture onto a supporting substrate and firing to form a photoconductive glass binder layer.

This invention relates to xerography, and more specifically, to a system for improving light sensitivity of glass binder plates.

In the art of xerography, it is usual to form an electrostatic latent image on a member or plate which comprises a substantially electrically conductive backing member such as, for example, a paper or metallic member, having a photoconductive insulating surface thereon. It has previously been found that a suitable plate for this purpose is a metallic member having a layer of vitreous selenium. Such a plate is characterized by being capable of receiving a satisfactory electrostatic charge and selectively dissipating such charge when exposed to a light pattern and, in general, is largely sensitive to light in the blue and blue-green spectral range.

The discovery of the photoconductive insulating properties of highly purified vitreous selenium has resulted in this material becoming the standard in commercial xerography. The photographic speed of this material is many times that of the prior art insulating materials. However, vitreous selenium suffers from two serious defects: (1) Its spectral response is very largely limited to the blue or near ultraviolet and (2) the preparation of uniform films of vitreous selenium has required highly involved and critical processes, particularly processes involving the preparation of extremely clean and uniform substrates and vacuum evaporation techniques. This, along with the high cost of selenium itself has led, by commercial necessity, to the use of selenium zerographic plates in repetitive processing cycles requiring that the selenium plate be reused many times so that the cost per copy sheet from such a plate be reasonably small.

The art of commercial xerography has thus looked to other materials in order to find photoconductive insulators having the advantages of vitreous selenium, while still not being limited by the disadvantages noted above. The patent to Middleton et al., U.S. Patent 3,121,006 sets forth a xerographic plate comprising a non-photoconductive organic binder material impregnated with inorganic photoconductive compounds. It has been found, however, that these binder plates, when possessing optimum photographic and spectral properties, are equally expensive as vitreous selenium and further, lack the physical hardness for use under long processing cycles which exist in commercial xerographic machines.

U.S. Patent 3,151,982 to Corrsin discloses the method of making a xerographic glass binder layer which comprises mixing finely divided photoconductive insulating materials, such as those shown by Middleton et al. above, with a glass frit and firing the mixture to form a layer of photoconductive particles embedded in the glass binder. This technique results in a formation of a vitreous enamel xerographic plate having an operating life of 25 to 250 times greater than that of selenium plates in regard to abrasion resistance. A further characteristic of the glass binder plate disclosed by Corrsin is that the xerographic properties of a used plate may be restored nearly to those of the new plate by refiring the plate under substantially the same conditions used as when making the plate. In addition, when used with certain cadmium chalcogenides such structures result in a plate of unusually high spectral sensitivity which extends into the red region of the spectrum whereas most practical xerographic plates, whether of the vitreous or binder type, are sensitive primarily in the ultraviolet and blue or blue-green regions of the spectrum. The broadened response of these glass binder plates is particularly characteristic of plates incorporating cadmium sulfoselenides.

Photoconductors for glass binder plates are generally doped with an activator such as copper or silver in order to achieve maximum photosensitivity. These materials may be prepared by conventional diffusion techniques wherein the activator is diffused into the photoconductive material under high temperature vacuum conditions or in high temperature and pressure hydrothermo processes, such as disclosed in U.S. Patent 2,876,202. Suitable predroped materials are available commercially from a number of sources.

It has been discovered, however, that these predoped materials show little or no increase in sensitivity after fusing to form the glass binder plate.

It can be seen that there is a need for glass binder plates having maximum photosensitivity which can be made by conventional techniques.

It is, therefore, an object of this invention to provide a glass binder plate which overcomes the above noted disadvantages.

It is another object of this invention to provide a method of producing a glass binder plate which has improved light sensitivity.

It is a further object of this invention to provide an improved glass binder plate.

It is yet a further object of this invention to provide a xerographic plate having maximum photosensitivity and yet which can be made by conventional techniques.

The foregoing objects and others are accomplished in accordance with this invention by preparing a xerographic inorganic fused glass binder plate having maximum photosensitivity by doping with an activator such as copper or silver in which said activator is added to the enamel slip already containing the photoconductive particles, and followed by drying and firing to make the glass binder plate.

By way of illustration and with no intent to limit the method of manufacturing a conventional glass binder plate, said plates are made by mixing known photoconductive materials such as those disclosed by the patents to Middleton and Reynolds, U.S. Patents 3,121,006 and 3,121,007, with a glass enamel material such as that shown by the patent to Corrsin, 3,151,982, and fusing the enamel to a conductive backing to form a uniform layer of photoconductive particles imbedded in the glass binder.

In general, a photoconductor is suitable in a binder plate if it shows a resistivity in the dark above about $10^9$ ohm-cm. and a lower resistivity when exposed to light. Typical materials which have been found useful in xerographic binder plates include, without limitation, cadium strontium sulfide, zinc sulfide, zinc oxide, zinc selenide, cadmium sulfide, cadmium selenide, mercuric sulfide, antimony sulfide, arsenic sulfide, lead monoxide, gallium selenide, indium sulfide, arsenic selenide, mercuric oxide, titanium dioxide, zinc titanate, zinc mangesium oxide, zinc silicate, lead monoxide, red lead, and cadmium sulfoselenide.

The glass binder may be broadly defined as a highly insulating fused inorganic nonphotoconductive glass, and is made up in various combinations of the three types of basic oxides used in making frits: acidic, basic and neutral or amphoteric. These glasses are adequately defined in the patent to Corrsin mentioned above, and are made up from compositions generally selected from the ranges set forth in Table I below. All figures are in mole percentages.

TABLE I

| | |
|---|---|
| $B_2O_3$ | 0–50 ⎫ |
| $T_1O_2$ | 0–10 ⎬ [1] 40–75 |
| $SiO_2$ | 0–50 ⎭ |
| CaO | ⎫ |
| ZnO | ⎪ |
| CdO | ⎬ [1] 10–35 |
| PbO | ⎭ |
| $Na_2O$ | ⎫ |
| $K_2O$ | ⎬ [1] 0–20 |
| $Li_2O$ | ⎭ |
| NaF | 0–10 |
| $Al_2O_3$ | 0–5 |
| $Sb_2O_3$ | 0–10 |
| $As_2O_3$ | 0–3 |

[1] Combined.

It should be pointed out these ranges of compositions may be varied and modified as would be obvious to those skilled in the art.

The glass binder plate may be supported on any convenient electrical ground or backing plate. Typical materials include aluminum, brass, stainless steel, copper, nickel, zinc, conductively coated glass or plastic, etc.

Such glass binder plates as described above are conventionally doped with an activator material such as copper or silver. The photoconductive pigments are usually purchased commercially in a pre-doped condition or the photoconductive material is doped prior to incorporating the photoconductive particle into the enamel or glass slurry prior to firing to form the glass plate. It had been found, however, that these conventionally doped photoconductive pigments fail to exhibit the expected increase in sensitivity after firing to form the glass binder plate. Pre-doped photoconductive particles have shown very low light sensitivity in the glass binder plates. It has been suggested that the particle size of these crystalline materials is too large and they cannot be ground without loss of sensitivity. See U.S. Patent 2,876,202 for an example of conventional doping techniques for photosensitive particles. It has also been suggested that the dopant (i.e., copper or silver) diffuses into the glass matrix during firing, destroying the sensitivity of the pigment of the photoconductive material.

It has been discovered that when copper or silver ions are added directly to the enamel slip already containing the photoconductive material, and the slip dried and fused to make a glass binder plate, no loss in sensitivity results. This is opposed to the present loss in sensitivity when pre-doped or conventionally doped photoconductive particles are used. Under the present invention a suitable solution of a copper or silver compound is prepared in distilled water and mixed into the slurry of the glass being prepared along with the photoconductive particles. The slurry is then dried and fired to form the binder plate. These plates are fired at temperatures in the range of about 500 to 1700° F. for times ranging from a few minutes up to about 30 minutes.

The copper or silver may be in any convenient ionic form. Typical compounds include without limitation, nitrates, chlorides, and sulfates of copper and silver. The amount of dopant is in relatively small amounts ranging from a few parts per million to about 1 percent by weight. A preferred range of about 100 to 2000 parts per million is used, in that 100 parts per million insure the desired effect, while no significant improvement is seen in amounts over about 2000 parts per million.

Optionally, gallium, indium, aluminum, and/or chlorine may be added to the slip in amounts equal to that of the copper or silver in order to compensate for some slight loss in conductivity due to the copper or silver addition. This slight loss in conductivity is characteristic with copper and silver doping.

Three specific glass compositions which are illustrative of those contemplated by this invention are listed below in Table II. These compositions are in weight percent.

The following examples using the glass compositions of Table II below, further specifically define the present invention with respect to the method of making a highly photosensitive glass binder plate. The parts and percentages in the disclosure are by weight unless otherwise indicated. The examples below are intended to illustrate the various preferred embodiments of the invention.

TABLE II

| Sample | CaO | SiO | $Na_2O$ | $B_2O_3$ | PbO | CdO | F | $Li_2O$ | $TiO_2$ | $ZnO_2$ | BaO | $Al_2O_3$ | $K_2O$ |
|---|---|---|---|---|---|---|---|---|---|---|---|---|---|
| Glass A | 2.5 | 44 | 14 | 8.0 | 15 | 3.4 | 4.0 | 3.0 | 5.4 | | | 0.5 | 0.2 |
| Glass B | 0.1 | 54 | 11 | 8.2 | 11 | 0.6 | 6 | 0.8 | 6.4 | 1.1 | 0.6 | 0.1 | 0.1 |
| Glass C | | 18.1 | .05 | 8.1 | 65.7 | 7.8 | | | .08 | .02 | 0.1 | | 0.05 |

EXAMPLE I

A slurry of 100 grams of Glass A of the composition shown in Table I is mixed with 10 grams of unactivated cadmium sulfide available from the Radio Corporation of America as F–2103 and F–2111 and 100 ml of water in a ball mill. After thorough mixing for 30 minutes with no activator or dopant addition, the slurry is spread on a stainless steel substrate with a doctor blade to give a film thickness of about 40 microns, dried in air at room temperature for 2 hours, and fired at a temperature of about 1250° F. for about 8 minutes to form a fused glass binder plate.

EXAMPLE II

A glass binder plate is made according to the method of Example I. A water solution of copper nitrate containing the copper in a concentration of about 250 parts per million is added to the slurry before drying and firing.

EXAMPLE III

A glass binder plate of Glass B composition of Table I containing 20 grams of cadmium selenide is made according to the method of Example I. A water solution of silver nitrate containing silver in a concentration of about 500 parts per million is added to the slurry prior to drying and firing.

EXAMPLE IV

A glass binder plate of Glass C composition of Table I, containing 30 grams of cadmium sulfoselenide is made according to the method of Example I. A water solution of copper chloride containing copper in a concentration of 1000 parts per million is added to the slurry prior to drying and firing.

A series of 39 xerographic glass binder plates are made in accordance with this invention using the three glass compositions designated A, B, and C as shown in Table II. Glass compositions A, B, and C, used 10 percent Cds, 20 percent CdSe, and 30 percent CdSSe, respectively, as the photoconductive material. These plates are prepared by the method set forth in Example I. Thirteen plates are in each of these groups; three plates being predoped (i.e., the photoconductor material being doped prior to mixing in the slurry) as conventionally done in the art, four plates containing essentially no dopant, and six plates being doped with varying amounts of copper or silver as contemplated by this invention.

The sensitivity of these plates was measured by electrostatically charging said plates beneath a corona discharge element to a uniform surface potential of 600 volts negative potential and then continuously exposed to a tungsten light source of 10 watts at a distance of 3 ft., and measuring the relative dissipation of charge by means of an electrometer. It is apparent from Table III that the sensitivity of the predoped plates 1–3, 14–16, and 27–29, is considerably less than that of plates 8–13, 21–26, and 34–39, doped in the manner as set forth in Examples II–IV. Surprisingly, the sensitivity of plates 4–7, 17–20, and 30–33 which contain no dopant is even better than that of the predoped plates.

TABLE III

| Plate No. | Dopant (p.p.m.) copper nitrate | Sensitivity standard light discharge (volts/sec.) |
|---|---|---|
| Glass A+10% (CdS pigment): | | |
| (1) Pre-doped | 250 | 4 |
| (2) Pre-doped | 500 | 6 |
| (3) Pre-doped | 1,000 | 5 |
| (4) No doping | | 17 |
| (5) No doping | | 14 |
| (6) No doping | | 9 |
| (7) No doping | | 18 |
| (8) Doped in situ | | 25 |
| (9) Doped in situ | 500 | 56 |
| (10) Doped in situ | 500 | 22 |
| (11) Doped in situ | 1,000 | 35 |
| (12) Doped in situ | 1,000 | 22 |
| (13) Doped in situ | 2,000 | 14 |

| Plate No. | Dopant (p.p.m.) silver nitrate | Sensitivity |
|---|---|---|
| Glass B+20% (CdSe pigment): | | |
| (14) Pre-doped | 250 | 4 |
| (15) Pre-doped | 500 | 4 |
| (16) Pre-doped | 1,000 | 5 |
| (17) No doping | | 16 |
| (18) No doping | | 15 |
| (19) No doping | | 10 |
| (20) No doping | | 17 |
| (21) Doped in situ | 250 | 27 |
| (22) Doped in situ | 500 | 40 |
| (23) Doped in situ | 500 | 29 |
| (24) Doped in situ | 1,000 | 34 |
| (25) Doped in situ | 1,000 | 26 |
| (26) Doped in situ | 2,000 | 16 |

| Plate No. | Dopant (p.p.m.) copper chloride | Sensitivity |
|---|---|---|
| Glass C+30% (CdSSe pigment): | | |
| (27) Pre-doped | 250 | 5 |
| (28) Pre-doped | 500 | 7 |
| (29) Pre-doped | 1,000 | 4 |
| (30) No doping | | 14 |
| (31) No doping | | 17 |
| (32) No doping | | 11 |
| (33) No doping | | 16 |
| (34) Doped in situ | 250 | 28 |
| (35) Doped in situ | 500 | 41 |
| (36) Doped in situ | 500 | 26 |
| (37) Doped in situ | 1,000 | 32 |
| (38) Doped in situ | 1,000 | 26 |
| (39) Doped in situ | 2,000 | 17 |

In summary, it can be seen from the tabulation of the xerographic data shown in Table III, that the predoped plates exhibited extremely poor light sensitivity, while the undoped plates show an intermediate range of sensitivity. By comparison, doped plates as contemplated by this invention, having the dopant added in situ to the glass slip, exhibited the highest standard light discharge.

The improved plates produced by the method contemplated in the present invention are normally used in a xerographic process which includes the basic steps of forming a latent electrostatic image and developing said image.

Although specific components and proportions have been stated in the above description of the preferred embodiments of this invention, other suitable materials and procedures such as those listed above may be used with similar results. In addition, other materials may be added to the plates which synergize, enhance, or otherwise modify their properties.

Other modifications and ramifications of the present invention would appear to those skilled in the art upon reading the disclosure. These are intended to be included within the scope of this invention.

What is claimed is:

1. A method of preparing a xerographic glass binder layer which comprises adding an activator to a mixture of glass binder material and an undoped photoconductive material, coating said mixture onto a supporting substrate, and firing to form a photoconductive glass binder layer.

2. A method of preparing a xerographic glass binder layer having improved sensitivity which comprises:
   (a) forming a slurry comprising a mixture of a glass frit and an undoped photoconductive material in a carrier liquid;
   (b) adding an activating material to said slurry;
   (c) drying said slurry and firing to form a glass binder layer.

3. The method of claim 2 wherein the activator comprises copper.

4. The method of claim 2 wherein the activator comprises silver.

5. The method of claim 2 wherein the activator material is present in a concentration from about a few parts per million up to about 1 percent by weight of the glass binder layer.

6. The method of claim 2 which further includes the addition of at least one additive selected from the group comprising gallium, indium, aluminum, and chlorine.

7. The method of claim 2 in which the plate is fired at a tempreature from about 500 to 1700° F.

8. The method of claim 2 wherein the photoconductive material comprises cadmium sulfoselenide.

9. The method of claim 2 wherein the photoconductive material comprises at least one photoconductor selected from the group comprising cadmium sulfide, cadmium selenide and cadmium sulfoselenide.

10. A method of forming a highly photosensitive glass binder layer from a liquid enamel slurry of undoped finely divided inorganic photoconductive particles and a frit of highly insulating inorganic non-photoconductive glass material, said method comprising adding an activator material to said slurry followed by a drying the slurry and firing to form a xerographic glass binder layer.

11. A method of forming a xerographic glass binder plate which comprises separately adding and mixing together appropriate amounts of an inorganic glass binder material, an undoped photoconductor material, and a photosensitive activator material with a liquid carrier to form an enamel slip, coating said enamel slip onto a supporting substrate, followed by firing to form a fused photoconductive glass binder layer.

References Cited

UNITED STATES PATENTS

| 2,937,353 | 5/1960 | Wasserman | 252—501 |
| 3,151,982 | 10/1964 | Corrsin | 252—501 |
| 3,379,527 | 4/1968 | Corrsin et al. | 96—1.5 |

NORMAN G. TORCHIN, Primary Examiner

J. R. HIGHTOWER, Assistant Examiner

U.S. Cl. X.R.

252—501